US006858686B2

(12) United States Patent
Laubry

(10) Patent No.: US 6,858,686 B2
(45) Date of Patent: Feb. 22, 2005

(54) PROCESS FOR OBTAINING A POLYISOPRENE WITH A HIGH CIS-1,4 LINKAGE CONTENT

(75) Inventor: Philippe Laubry, Greer, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 55 days.

(21) Appl. No.: 10/454,287

(22) Filed: Jun. 4, 2003

(65) Prior Publication Data

US 2003/0212220 A1 Nov. 13, 2003

Related U.S. Application Data

(63) Continuation of application No. PCT/EP01/13928, filed on Nov. 28, 2001.

(30) Foreign Application Priority Data

Dec. 14, 2000 (FR) ............................................. 00 16456

(51) Int. Cl.$^7$ .......................... C08F 4/54; C08F 136/08
(52) U.S. Cl. ....................... 526/153; 526/164; 526/290; 526/340.2
(58) Field of Search ................................. 526/153, 164, 526/290, 340.2

(56) References Cited

U.S. PATENT DOCUMENTS

| 5,096,970 A | 3/1992 | Hattori et al. ............... 525/268 |
| 6,130,299 A | 10/2000 | Sone et al. .................... 526/89 |
| 6,255,416 B1 * | 7/2001 | Sone et al. ................. 526/153 |
| 6,350,833 B1 | 2/2002 | Knauf et al. ................. 526/164 |
| 6,437,205 B1 * | 8/2002 | Miller et al. ............ 526/164 X |

FOREIGN PATENT DOCUMENTS

| EP | 0 304 088 B1 | 2/1989 |
| EP | 0 846 707 | 6/1998 |
| EP | 1 048 675 A1 | 2/2000 |
| JP | 58 154 705 | 9/1983 |

OTHER PUBLICATIONS

Schoenberg, H.A. Marsh, S.J. Walters, W.M. Saltman, Rubber Chemistry and Technology, 1979, vol. 52, pp. 564–565.

* cited by examiner

Primary Examiner—Fred Teskin
(74) Attorney, Agent, or Firm—Burns, Doane, Swecker & Mathis, L.L.P.

(57) ABSTRACT

The present invention relates to a process for obtaining a polyisoprene having a high cis-1,4 linkage content, from a steam-cracked C5 naphtha fraction enriched with isoprene. The process of the present invention comprises reacting a steam-cracked C5 naphtha fraction in the presence of a catalytic system, wherein the C5 fraction is enriched with isoprene such that the mass fraction of isoprene in said enriched fraction lies within a range of from 30% to 95%, and the catalytic system is based on at least (a) a conjugated diene monomer, (b) an organic phosphoric acid salt of one or more rare earth metals, (c) an alkylating agent consisting of an alkylaluminum of the formula $AlR_3$ or $HAlR_2$, and (d) a halogen donor consisting of an alkylaluminum halide, said salt being suspended in at least one inert saturated hydrocarbon solvent of aliphatic or alicyclic type which is included in said catalytic system, and the molar ratio of alkylating agent:rare earth salt is in a range of from 1 to 5.

21 Claims, No Drawings

PROCESS FOR OBTAINING A POLYISOPRENE WITH A HIGH CIS-1,4 LINKAGE CONTENT

The present application is a continuation of PCT/EP01/13928, filed Nov. 28, 2001, published in French on Jun. 20, 2002 as WO02/48210.

BACKGROUND OF THE INVENTION

The present invention relates to a process for obtaining a polyisoprene having a high cis-1,4 linkage content from a steam-cracked C5 naphtha fraction enriched with isoprene.

Steam-cracked C5 naphtha fractions contain isoprene in a mass fraction of about 10%–30%. Such fractions can also contain:

- mono-olefins (e.g. α-olefins and β-olefins), in a mass fraction of from 20% to 40%,
- dienes, such as cyclopentadiene, 1,3-pentadiene (also referred to as piperylene) and other pentadienes, in a mass fraction of from 20% to 30%,
- alkanes,
- limonene (dimer of isoprene) and, in a minority proportion,
- acetylene and aromatic compounds.

In order to efficiently catalyze selective polymerization of isoprene with high activity from a steam-cracked C5 naphtha fraction, the fraction must first be enriched with isoprene so that the mass fraction of isoprene in the enriched fraction is close to 100%. In fact, it turns out that the presence of the other aforementioned compounds adversely affects the yield of the isoprene polymerization reaction. In particular, the enriched fraction must be practically devoid of cyclopentadiene, which is a poison to catalytic systems.

Enrichment of the mass fraction of isoprene in the steam-cracked C5 naphtha fraction may be obtained by implementing the following operations.

First and foremost, the cyclopentadiene is removed from the initial fraction using a polar solvent by fractional or extractive distillation, followed by distillation on maleic anhydride. To remove the acetylene compounds in the fraction, distillation may be performed over diisobutylaluminum hydride. Finally, the residual polar impurities are removed, for example, by passing over alumina.

It is known that polyisoprenes having a high cis-1,4 linkage content may be obtained using a catalytic system based on titanium tetrachloride and an alkylaluminum. The article by E. Schoenberg, H. A. Marsh, S. J. Walters, W. M. Saltman, Rubber Chemistry and Technology, 1979, vol. 52, pp. 564–565, indicates that, if this catalytic system is used for the polymerization of isoprene, the steam-cracked C5 naphtha fraction must have previously been enriched so as to comprise isoprene in a mass fraction of at least 97%.

Furthermore, Schoenberg et. al. teach that the mass fraction of mono-olefins in the enriched fraction cannot exceed 3.8% (of which the α-olefins cannot exceed 1% and the β-olefins cannot exceed 2.8%), and the limonene cannot exceed 0.1%. Moreover, the mass fraction of cyclopentadiene cannot exceed 1 ppm (ppm: parts per million), piperylene cannot exceed 80 ppm, and the acetylene compounds cannot exceed 50 ppm.

It is known that polyisoprenes having a high cis-1,4 linkage content may be obtained using catalytic systems based on:

- a rare earth salt in solution in a hydrocarbon solvent,
- an alkylating agent of this salt consisting of an alkylaluminum, and
- an alkylaluminum halide.

For example, the document "Report of the Academy of Sciences of the USSR, volume 234, no. 5, 1977 (Y. B. Monakov, Y. R. Bieshev, A. A. Berg, S. R. Rafikov)", shows the use of a catalytic system comprising:

- a bis(2-ethylhexyl)phosphoric acid salt of neodymium or praseodymium, as the rare earth salt, in solution in toluene,
- triisobutylaluminum as the alkylating agent, in a molar ratio (alkylating agent:rare earth salt) of 20, and
- diethylaluminum chloride as the alkylaluminum halide.

Similar to catalytic systems based on titanium, the selective polymerization of isoprene with high activity can only be contemplated from a C5 fraction which has been enriched so that it will comprise isoprene in a mass fraction close to 100%.

The extraction from the C5 fraction of practically pure isoprene has the disadvantage of requiring the implementation of a complex separation process and, consequently, of involving relatively high operating costs for the polymerization of isoprene.

SUMMARY OF THE INVENTION

The present invention relates to a process for obtaining a polyisoprene having a high cis-1,4 linkage content, from a steam-cracked C5 naphtha fraction enriched with isoprene.

The process of the present invention comprises reacting a catalytic system in the presence of an enriched C5 fraction, and wherein the C5 fraction is enriched with isoprene such that the mass fraction of isoprene in said enriched fraction lies within a range of from 30% to 95%, and the catalytic system is based on at least:
- a conjugated diene monomer,
- an organic phosphoric acid salt of one or more rare earth metals,
- an alkylating agent consisting of an alkylaluminum of the formula $AlR_3$ or $HAlR_2$, and
- a halogen donor consisting of an alkylaluminum halide, said salt being suspended in at least one inert saturated hydrocarbon solvent of aliphatic or alicyclic type which is included in said catalytic system, and the molar ratio of alkylating agent:rare earth salt is in a range of from 1 to 5.

DETAILED DESCRIPTION OF THE INVENTION

The object of the present invention is based on the unexpected discovery that a catalytic system based on at least:

a conjugated diene monomer, an organic phosphoric acid salt of a rare earth metal (a metal with an atomic number between 57 and 71 in Mendeleev's periodic table), an alkylating agent consisting of an alkylaluminum of the formula $AlR_3$ or $HAlR_2$, and a halogen donor consisting of an alkylaluminum halide, said salt suspended in at least one inert saturated hydrocarbon solvent of aliphatic or alicyclic type which is included in said catalytic system, and the molar ratio (alkylating agent:rare earth salt) being in a range from 1 to 5, permits the selective polymerization of isoprene with high catalytic activity to obtain a polyisoprene having a high cis-1,4 linkage content, from a steam-cracked C5 naphtha fraction which has been only slightly enriched with isoprene, comprising a mass fraction of isoprene which is as low as 30%.

The phrase "based on" is used to define the constituents of the catalytic system and is taken to mean the mixture and/or the reaction product of these constituents. Also, the phrase "a rare earth metal" is intended to mean "one or more rare earth metals."

The C5 fraction, which is only slightly enriched with isoprene, may be obtained by implementing a simplified enrichment process comprising successively:

simply or extractively distilling to remove the major part of the dienes other than isoprene, in particular cyclopentadiene, distilling over maleic anhydride to remove practically any residual cyclopentadiene, removing the vinylacetylene compounds (residual "true" alkynes) by distillation on diisobutylaluminum hydride (DiBAH), and passing over alumina or over a molecular sieve to remove the residual polar impurities.

According to a variant embodiment of the invention, the C5 fraction, which is only slightly enriched with isoprene, may also be obtained by implementing a simplified enrichment process comprising successively:

simply or extractively distilling to remove the major part of the dienes other than isoprene, in particular cyclopentadiene, removing the vinylacetylene compounds (residual "true" alkynes) by a selective catalytic hydrogenation reaction, distilling over maleic anhydride to remove practically any residual cyclopentadiene, and passing over alumina or over a molecular sieve to remove the residual polar impurities.

It will be noted that the high yield selective polymerization takes place a fortiori from a C5 fraction which is significantly enriched with isoprene. Preferably, the mass fraction of isoprene is greater than 30%, more preferably the mass fraction is within a range of between 30% and 70%. Of course, the mass fraction of isoprene may be of even higher values, for example reaching 95%.

Simplification of the purification operation of the C5 fraction results in the possibility of substantially lowering the overall cost of obtaining polyisoprenes.

In an embodiment of the invention, the enriched C5 fraction comprises aliphatic and alicyclic mono-olefins, wherein the mass ratio of aliphatic and alicyclic mono-olefins:isoprene is less than or equal to 50%, preferably between 4% and 50% and, most preferably, between 20% and 50%.

In another embodiment of the invention, the enriched C5 fraction comprises mono-olefins, e.g. α-olefins and β-olefins, wherein the mass ratio of α-olefins:isoprene is less than or equal to 30%, preferably between 1% and 30%, and the mass ratio of β-olefins:isoprene is less than or equal to 20%, preferably between 3% and 20%.

It will be noted that the enriched C5 fraction comprises:

1,3-pentadiene, wherein the mass ratio of 1,3-pentadiene:isoprene is less than or equal to 0.5%, preferably between 0.01% and 0.5%, disubstituted alkynes, wherein the mass ratio of disubstituted alkynes:isoprene is less than or equal to 0.7%, preferably between 0.01% and 0.7%, vinylacetylene compounds (also known as "true" alkynes), wherein the mass ratio of vinylacetylenes:isoprene is less than or equal to 15 ppm (parts per million) and preferably between 1 ppm and 15 ppm, 1,4-pentadiene, wherein the mass ratio of 1,4-pentadiene:isoprene is less than or equal to 0.2% and preferably between 1 ppm and 2000 ppm, cyclopentadiene, wherein the mass ratio of cyclopentadiene:isoprene is less than or equal to 5 ppm and preferably between 1 ppm and 5 ppm, and limonene, wherein the mass ratio of limonene:isoprene is less than or equal to 2% and preferably between 0.1% and 2%.

It will be noted that the constituents other than isoprene in the enriched C5 fraction according to the invention may be present in the fraction in mass fractions which are much higher than those of the same constituents of the C5 fractions, which have been enriched with isoprene in known manner for the polymerization of the latter, such as the enriched C5 fraction as discussed in the aforementioned article by E. Schoenberg, H. A. Marsh, S. J. Walters, W. M. Saltman, Rubber Chemistry and Technology, 1979, vol. 52, p. 565, while permitting the selective polymerization of isoprene with a high catalytic activity to obtain a polyisoprene having a high cis-1,4 linkage.

It will also be noted that the polyisoprenes obtained from the process of the present invention have high viscosities.

Advantageously, the polyisoprenes obtained by means of this catalytic system and this C5 fraction enriched with isoprene have a cis-1,4 linkage content, measured with carbon-13 nuclear magnetic resonance and mid-infrared analysis, within a range of from 98.0% to 99.6%.

It will be noted that when the polymerization operations are carried out at temperatures from 25° C. to 55° C., the polyisoprenes obtained using the catalytic system of the present invention have a cis-1,4 linkage content, measured with carbon-13 nuclear magnetic resonance and mid-infrared analysis, within a range from 98.0% to 98.5%.

Advantageously, when the polymerization operations are carried out at temperatures less than or equal to 5° C., the polyisoprenes obtained using the catalytic system of the present invention have a cis-1,4 linkage content, measured with carbon-13 nuclear magnetic resonance and mid-infrared analysis, within a range of from 99.0% to 99.6%.

It will be noted that such low-temperature polymerization operations can be implemented in an inert hydrocarbon solvent, or alternatively without a solvent.

In particular, the catalytic system of the present invention makes it possible to obtain polyisoprenes having a cis-1,4 linkage content in a range of from 99.3% to 99.6% at polymerization temperature of from –55° C. to –20° C., as measured by carbon-13 nuclear magnetic resonance and mid-infrared analysis.

Preferably the catalytic system of the present invention makes it possible, at polymerization temperatures of from –55° C. to –45° C., to obtain polyisoprenes having a cis-1,4 linkage content equal to 99.6% as measured by carbon-13 nuclear magnetic resonance and mid-infrared analysis.

The cis-1,4 linkage content of the polyisoprene obtained which are close to 100%, characterizes natural rubber and have not been achieved to date in a synthetic manner.

The aforementioned values of cis-1,4 linkage content take into account measurements derived from mid-infrared analysis after calibration of the samples of polyisoprene, which is effected within the scope of $^{13}$C-NMR analysis, and of $^{13}$C-NMR analysis. The measurements obtained by one of these techniques is confirmed by the other technique. The inherent inaccuracy of measurement of +/−0.1% for both techniques is disregarded. The accuracy of these values of cis-1,4 linkage content is thus increased, relative to that of the values of the contents which have been mentioned in the prior art to date.

The particularly high cis-1,4 linkage content obtained for the polyisoprenes using the process of the present invention is independent of the quantity of catalytic system used.

The catalytic systems of the present invention are characterized by a molar ratio of alkylating agent:rare earth salt which is extremely low in comparison to the molar ratios of equal to or greater than 20 which have been used in catalytic systems to date. The low molar ratio permits a significant increase in the activity of the catalytic systems of the present invention.

Preferably, the catalytic system of the present invention is characterized by a molar ratio (alkylating agent:rare earth salt) having a value ranging from 1 to 2.

1,3-Butadiene may be mentioned as a preferred conjugated diene monomer usable for "preforming" the catalytic system of the invention.

Other conjugated dienes that may be used include 2-methyl-1,3-butadiene (or isoprene), 2,3-di(C1 to C5 alkyl)-1,3-butadienes such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, phenyl-1,3-butadiene, 1,3-pentadiene, 2,4-hexadiene, or any other conjugated diene having between 4 and 8 carbon atoms.

It will be noted that the molar ratio of monomer:rare earth salt may have a value ranging from 25 to 50.

According to another characteristic of the invention, the rare earth salt consists of a non-hygroscopic powder having a slight tendency to agglomerate at ambient temperature.

According to a preferred embodiment of the invention, the inert hydrocarbon solvent in which said rare earth salt is suspended is a low molecular weight aliphatic or alicyclic solvent, such as cyclohexane, methylcyclohexane, n-heptane or a mixture of these solvents.

According to another embodiment of the invention, the solvent used to suspend the rare earth salt is a mixture of a high molecular weight aliphatic solvent comprising a paraffinic oil, for example petrolatum oil, and of a low molecular weight solvent such as those mentioned above, for example, methylcyclohexane.

The suspension is prepared by dispersive grinding of the rare earth salt in the paraffinic oil in a manner as to obtain a very fine and homogeneous suspension of the salt.

According to another characteristic of the invention, the catalytic system comprises the rare earth metal in a concentration equal to or substantially equal to 0.02 mol/l.

According to a preferred embodiment of the invention, a tris[bis(2-ethylhexyl)phosphate] salt of the rare earth metal or metals is used as the salt.

Preferably, the rare earth salt is neodymium tris[bis(2-ethylhexyl)phosphate].

Alkylating agents that can be used in the catalytic system of the present invention include alkylaluminums such as:

trialkylaluminums, for example triisobutylaluminum, or dialkylaluminum hydrides, for example diisobutylaluminum hydride.

It will be noted that the alkylating agent preferably consists of diisobutylaluminum hydride (DiBAH).

Halogen donors that can be used in the catalytic system of the present invention include alkylaluminum halides, preferably diethylaluminum chloride (DEAC).

The molar ratio of halogen donor:rare earth salt has a value ranging from 2.6 to 3.

According to the invention, the process for the preparation of said catalytic system comprises:

preparing a suspension of rare earth salt in the solvent, adding a conjugated diene monomer to the suspension, adding an alkylating agent to the suspension comprising said monomer to obtain an alkylated salt, and adding a halogen donor to the alkylated salt.

EXAMPLES

The aforementioned characteristics of the present invention, as well as others, will be better understood upon a reading of the following description of several examples of embodiments of the present invention, which are given by way of illustration and not of limitation.

For each of the examples hereafter, a steam-cracked C5 naphtha fraction (fraction not enriched with isoprene) was initially used, the composition of which is as follows:

| Isoprene | 24% | |
|---|---|---|
| Alkanes | 14% | |
| Mono-olefins | 36%, | (α-olefins 17%; β-olefins 19%.) |
| Acetylenes | 1% | |
| Aromatics | 2% | |
| Dienes | 23%, | (1,4-pentadiene 3%; piperylene 11%; cyclopentadiene 8%; other dienes 1%.) |

Example 1

Synthesis of Polyisoprenes from a First C5 Fraction Enriched with Isoprene

I. Obtaining a First C5 Fraction Enriched with Isoprene According to the Present Invention The initial C5 fraction was subjected to a series of stages of isoprene enrichment, in order to obtain an enriched C5 fraction in which the mass fraction of isoprene was only 62%.

In a first enrichment stage, simple distillation of the initial C5 fraction on a 50-plate column was carried out, so that the mass fraction of cyclopentadiene in the fraction was reduced to 600 ppm.

In a second enrichment stage, distillation over maleic anhydride of the fraction obtained following said first stage was carried out, using a molar ratio of maleic anhydride::cyclopentadiene that was substantially equal to 30, so that the mass fraction of cyclopentadiene in the fraction was reduced to a value of less than 5 ppm. Furthermore, the mass fraction of residual "true" alkynes (vinylacetylenes) in the fraction was reduced to 750 ppm.

In a third enrichment stage, distillation of the fraction obtained following said second stage was performed over diisobutylaluminum (DiBAH), so that the mass fraction of the vinylacetylenes was reduced to 10 ppm in the fraction. A molar ratio of DiBAH:vinylacetylenes of substantially equal to 40 was used for this distillation.

In a fourth enrichment stage, the fraction thus obtained was passed over alumina, in order to remove practically all the residual polar compounds.

Analysis by gas phase chromatography (GPC), as described in detail in "Measurements and Tests" below, made it possible to determine the composition of the enriched C5 fraction following these four stages (expressed in mass fractions of constituents in the fraction):

| | |
|---|---|
| 1-pentene | 3% |
| 2-methyl-1-butene | 8% |
| pentane | 21% |
| isoprene | 62% |
| others | 3% |
| 2-pentene | 3%. |

It will be noted that the relative mass ratio of mono-olefins:isoprene was substantially equal to 22.6% in this example of embodiment.

As for the relative mass ratios of α-olefins:isoprene and β-olefins:isoprene, they was substantially equal to 17.7% and 4.8%, respectively.

II. Preparation of a Catalytic System 1 According to the First Example of Embodiment of the Invention for the Polymerization of Isoprene 1) Synthesis of an organic phosphate salt of neodymium for the preparation of catalytic system 1:

a) Synthesis of an aqueous solution of neodymium $NdCl_3, 6H_2O$:

96 g of $Nd_2O_3$ (sold by RHODIA), which has been determined by complexation analysis to have an Nd content of 85.3% (theoretical value 85.7%), thereby amounting to 0.57 mol of Nd, was weighed out into a "tall" form 600 ml beaker.

80 ml of demineralized water were added. Under a fume hood, 150 ml of 36 wt. % concentrated HCl (d=1.18), namely 1.75 mol of HCl (molar ratio HCl:Nd=1.75:0.57=3.07), were slowly added at ambient temperature while the mixture was stirred with a magnetic stirrer.

The reaction $Nd_2O_3+6HCl+9H_2O \rightarrow 2NdCl_3, 6H_2O$ is highly exothermic.

Once all the hydrochloric acid has been added, the solution was raised to boiling while being stirred with a magnetic stirrer. The aqueous $NdCl_3$ solution was clear and mauve in color. No insoluble product ($Nd_2O_3$) remained.

This solution was then evaporated until a volume of 130 ml remained in the beaker. The $NdCl_3, 6H_2O$ was highly concentrated (it crystallized at ambient temperature).

The concentrated solution of $NdCl_3$ was then poured into a 10 liter drum containing 4500 ml of demineralized water at ambient temperature, while the mixture was stirred (using a motor with an anchor agitator).

The pH of the solution, measured at 25° C., was close to 4.

1500 ml of technical grade acetone were then added to the solution. No insoluble product remained and the resultant solution was pink in color.

b) Synthesis of an organic sodium phosphate of formula $[RO]_2P(O)ONa$ (R=2-ethylhexyl):

68 g, or 1.70 mol, of NaOH flakes were dissolved in a 5 liter beaker containing 1500 ml of demineralized water. 554 g of an organic phosphoric acid (bis(2-ethylhexyl) phosphoric acid, listed in the "Aldrich" catalogue under number 23,782–5), namely 1.72 mol of this acid, were dissolved in another 3 liter beaker containing 500 ml of acetone. The molar ratio NaOH:organic phosphoric acid was 1.70:1.72 or 0.99.

At ambient temperature and while stirring the mixture by hand with a glass stirrer, the solution of said organic phosphoric acid was poured into the NaOH solution. The reaction is as follows:

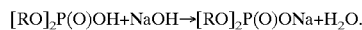

The reaction is slightly exothermic and a homogeneous solution of a yellowish color was obtained. The pH of the solution, measured at 25° C., was close to 7.

c) Synthesis of a phosphated neodymium salt of the formula $[[RO]_2P(O)O]_3Nd$:

At ambient temperature and while the mixture was being vigorously stirred (motor with anchor agitator), the organic Na phosphate salt obtained in paragraph b) above was poured into the aqueous solution of $NdCl_3, 6H_2O$ obtained in paragraph a) above.

A very fine white precipitate formed immediately. Stirring of the resultant mixture was continued for 30 minutes once all the organic Na phosphate had been added (in a molar ratio $(RO)_2P(O)ONa:NdCl_3=1.70:0.57=2.98$). The reaction is as follows:

The resultant phosphated neodymium salt was recovered and washed in a centrifuge equipped with a "sock".

The pH of the mother liquors was between 3 and 4 at 25° C. These mother liquors were colorless and clear.

The salt obtained was divided into two samples, then each sample was washed with an acetone/demineralized water mixture, performing the washing cycle described below three times in order to remove all the chlorides.

Each washing cycle was performed in a 10 liter plastic bucket initially containing 2 liters of acetone. Each sample was then homogenized with the acetone using an "Ultra-Turrax" homogenizer for approximately 1 minute in order to obtain a milky solution.

4 liters of demineralized water were then added to the bucket and the resultant mixture was homogenized for 3 minutes using the same homogenizer.

The resultant mixture was centrifuged and the phosphated neodymium salt was recovered in the "sock".

The qualitative analytic test for chlorides was virtually negative for the final washing water (the reaction is as follows:

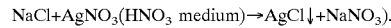

The neodymium salt washed in this manner is dried in an oven under a vacuum and with air-flow for approximately 80 hours.

The final yield for each of the synthesis tests performed was between 95% and 98%, depending upon the losses arising during washing. In each case, approximately 600 g of dry phosphated neodymium salt was obtained.

The mass contents of neodymium, determined both by complexometric back titration with ethylenediaminetetraacetic acid (EDTA) and by inductively-coupled plasma atomic emission spectrometry (ICP-AES), were substantially between 12.5% and 12.8% (with a theoretical content τ of 13.01% where τ=[144.24/1108.50]×100, where 144.24 g/mol=molar mass of neodymium).

For each of these two methods, the neodymium content measurements were performed after wet acid mineralization of the salt, either in a sand bath in an open system or in a microwave oven in a closed system.

The complexometric back titration with EDTA involved back titration with complexation of neodymium with an excess of EDTA (ethylenediaminetetraacetic acid), in which the excess EDTA is determined at pH=4.6 with zinc sulphate.

A colored indicator was used with photometric detection of the equivalence point.

Inductively-coupled plasma atomic emission spectrometry is an elemental analytical method based on the observation of the radiation emitted by atoms raised to an excited state in a plasma.

The emitted radiation used for analysis of neodymium corresponds to wavelengths of 406.109 nm and 401.225 nm.

This spectrometric method was implemented by previously calibrating the system with "control" neodymium salts having a known neodymium content.

The following Table I shows the Nd contents obtained by means of these two methods (the number of tests performed on each salt sample is shown in brackets).

TABLE I

| Salt samples analysed | Percentage Nd content by complexometric titration | Percentage Nd content by ICP/AES | Relative deviation between the 2 methods |
|---|---|---|---|
| Phosphated Nd salt [[RO]$_2$P(O)O]$_3$Nd | 12.8 (9) | 12.8 (3) | 0% |
| Phosphated Nd salt [[RO]$_2$P(O)O]$_3$Nd | 12.8 (4) | 12.6 (3) | 1.6% |
| Phosphated Nd salt [[RO]$_2$P(O)O]$_3$Nd | 12.7 (6) | 12.2 (4) | 4% |
| Phosphated Nd salt [[RO]$_2$P(O)O]$_3$Nd | 12.6 (6) | 12.5 (4) | 0.8% |
| Nd acetylacetonate "control" | 31.7 (6) | 32.4 (4) | 2.2% |
| Nd oxalate "control" | 37.7 (3) | 38.0 (3) | 0.8% |

The results obtained by the two methods were comparable (relative deviation<4%).

2) Synthesis of catalytic system 1:

a) Composition of this catalytic system 1:

Catalytic system 1 comprises a phosphated neodymium salt as synthesized in section 1) above, which was suspended in a low molecular weight inert hydrocarbon solvent (formed of methylcyclohexane, abbreviated to "MCH" hereafter).

Catalytic system 1 was characterized by the following relative molar ratios, with respect to the neodymium salt:

Nd salt:butadiene (Bd hereafter):DiBAH:DEAC=1:25:1.8:2.6.

b) Process for synthesizing catalytic system 1:

First Stage:

In order to obtain catalytic system 1, 15.6 g of the neodymium salt, in powder form, were poured into a 1 liter reactor from which the impurities previously had been removed. This salt was then subjected to nitrogen bubbling from the bottom of the reactor for a period of 15 minutes.

Second Stage:

90% (mass fraction) of the methylcyclohexane (used as solvent) was introduced into the reactor containing the neodymium salt.

The duration of contact of the neodymium salt with the methylcyclohexane was 30 minutes, and the temperature of contact was 30° C.

Third Stage:

Butadiene was introduced into the reactor (in the molar ratio of salt:butadiene of 1:25 as mentioned in section (a) above), at a temperature of 30° C., for "preforming" the catalytic system.

Fourth Stage:

Diisobutylaluminum hydride (DiBAH) was introduced into the reactor as the alkylating agent for the neodymium salt in a concentration of approxoimately 1 M, together with a quantity of methylcyclohexane corresponding to a mass fraction of 5% of the entire quantity of said solvent. The duration of the alkylation was 15 minutes and the temperature of the alkylation reaction was 30° C.

Fifth Stage:

Diethylaluminum chloride (DEAC) was introduced into the reactor as the halogen donor in a concentration of approximately 1 M, together with a quantity of methylcyclohexane corresponding to the remaining mass fraction of 5% of the entire quantity of said solvent. The temperature of the reaction medium was adjusted to 60° C.

Sixth Stage:

The resultant mixture was then "preformed" (or aged) by maintaining this temperature of 60° C. for a period of 2 hours.

Seventh Stage:

In this manner, approximately 700 ml of a solution of catalytic system 1 was obtained. The reactor was emptied and this solution was transferred to a 750 ml "Steinie" bottle, which had been previously was washed, dried and subjected to nitrogen bubbling.

Finally, the catalytic solution was stored under a nitrogen atmosphere in a freezer at a temperature of −15° C.

III. Preparation of Polyisoprenes by Means of Catalytic System 1, from the Enriched C5 Fraction in Accordance with this First Example A 250 ml "Steinie" bottle was used as a polymerization reactor. The bottle contains 10 g isoprene and the tightness of which was ensured by a "septum/open-top seal" assembly which permitted addition of catalytic system 1 using a syringe.

The polymerization of the isoprene was carried out in cyclohexane at 50° C. in an inert atmosphere (nitrogen), by subjecting the bottle to stirring in a water tank.

Several polymerization tests were carried out in which polyisoprenes were prepared from the enriched C5 fraction in accordance with section I of Example 1 above, as well as, from practically pure isoprene ("control" polyisoprene).

This practically pure isoprene was extracted conventionally in a laboratory from a steam-cracked C5 naphtha fraction, by carrying out the following steps:

distillation of the initial C5 fraction over maleic anhydride to remove any residual cyclopentadiene, passage through an alumina column to remove polar impurities, and nitrogen bubbling for 20 min, immediately prior to the polymerization reaction.

The mass fraction of isoprene extracted from this C5 fraction was determined to be 99.2% gas phase chromatography (GPC), as described in detail in "Measurements and Tests" below.

Given quantities of neodymium catalyst base were used (approximately 300 micromoles per 100 grammes of monomer, quantities expressed in $\mu$Mcm).

The tests were carried out with a mass ratio S:M (solvent:monomer) which was equal to 9, the mass fraction of isoprene in the polymerization medium being equal to 25%.

Acetylacetone was used as a polymerization reaction shortstopping agent (1 ml of a 1 M acetylacetone solution in cyclohexane), and N-1,3-dimethylbutyl-N'-phenyl-p-phenylenediamine (abbreviated to 6PPD) as a protection agent (in a volume of 1 ml at a concentration of 20 g/l in cyclohexane, giving a mass of 0.02 g).

The polyisoprene then was extracted from each resultant polymer solution by steam stripping for 30 minutes, in the presence of calcium tamolate (using 2 ml of tamol and 50 ml of CaCl$_2$ at 30 g/l). Then each extracted solution was dried for approximately 18 hours in an oven at 60° C. under a vacuum (at a pressure of 200 mm Hg), under a gentle stream of nitrogen.

The conversion rate of isoprene to polyisoprene as a function of reaction time was measured to describe the polymerization kinetics for each test.

The inherent viscosity at 0.1 g/dl in toluene, measured at 25° C., characterizes the macrostructure of each polyisoprene obtained.

Table 2 hereafter shows the results obtained for each polymerization test.

TABLE 2

| Test | Isoprene used | Ratio S:M | Quantity of Nd (μMcm) | Reaction time (min.) | Conversion rate (%) | Inherent viscosity (dl/g) |
|---|---|---|---|---|---|---|
| | Polymerization conditions (at 50° C. with the catalytic system 1) | | | | | Polyisoprene |
| A | Enriched C5 fraction | 9 | 300 | 20 | 59 | — |
| | | | | 40 | 81 | — |
| | | | | 60 | 91 | 4.67 |
| B | control | 9 | 290 | 20 | 60 | — |
| | | | | 40 | 80 | — |
| | | | | 60 | 93 | 4.84 |

These results show that catalytic system 1 of the present invention permitted the selective polymerization of isoprene from a steam-cracked C5 naphtha fraction enriched to only 62% isoprene, with a reaction rate analogous to that relating to the polymerization of practically pure isoprene ("control").

Furthermore, the polyisoprenes which were prepared at a temperature of 50° C. from said C5 fraction enriched to 62%, just like the "control" polyisoprenes, all had the same 98.0% cis-1,4 linkage content, as measured by the $^{13}$C-NMR technique and the MIR technique as described in detail in "Measurements and Tests" below.

It will be noted that the polyisoprenes obtained have particularly low polymolecularity indices, which vary from 2.1 to 2.3 using the SEC measurement method as described in "Measurements and Tests" below.

Example 2

Synthesis of Polyisoprenes from a Second C5 Fraction Enriched with Isoprene

I. Obtaining a Second C5 Fraction Enriched with Isoprene According to the Invention The initial C5 fraction was subjected to a series of stages of enrichment in isoprene, in order to obtain an enriched C5 fraction in which the mass fraction of isoprene is 56%.

The procedure was performed as described in section (I) of Example 1, with the following changes to the protocol:

the first stage of distillation on the 50-plate column was of "extractive" type, having been implemented by means of a polar extraction solvent (consisting of dimethyl formamide at a concentration of 3%);

the mass fraction of cyclopentadiene following the first stage was 150 ppm;

the mass fraction of vinylacetylenes following the second distillation stage over maleic anhydride was 950 ppm.

Analysis by gas phase chromatography, performed as described in detail in "Measurements and Tests" below, made it possible to determine the composition of the enriched C5 fraction following these four stages (expressed in mass fractions of constituents in the fraction):

| | |
|---|---|
| 1-pentene | 5% |
| 2-methyl-1-butene | 11% |
| pentane | 20% |
| isoprene | 56% |
| others | 3% |
| 2-pentene | 5%. |

It will be noted that the relative mass ratio of monoolefins:isoprene was substantially equal to 37.5% for this example.

The relative mass ratios of α-olefins:isoprene and β-olefins:isoprene, they were substantially equal to 28.6% and 8.9%, respectively.

II. Preparation of Catalytic System 2 According to a Second Example of Embodiment of the Invention for the Polymerization of Isoprene Catalytic system 2 comprised a phosphated neodymium salt as synthesized in Example 1, and differed from the catalytic system 1 of Example 1 by:

the relative molar ratios Nd salt:butadiene (Bd hereafter):DiBAH:DEAC, respectively 1:30:1.8:2.6, the duration of the alkylation stage, which was 30 minutes, and the duration of the "preformation" stage with DEAC, which was one hour.

III. Preparation of Polyisoprenes by Means of Catalytic System 2, from the Enriched C5 Fraction in Accordance with this Second Example of Embodiment As in Example 1, polymerization tests were carried out, using either the enriched C5 fraction in accordance with this second example and, or the 99.2% pure isoprene ("control" tests).

The conditions of polymerization and recovery of the polyisoprenes were the same as those described in Example 1.

Table 3 below sets forth the results obtained.

TABLE 3

| Test | Isoprene used | Ratio S:M | Quantity of Nd (μMcm) | Reaction time (min.) | Conversion rate (%) | Inherent viscosity (dl/g) |
|---|---|---|---|---|---|---|
| | Polymerization conditions (at 50° C. with the catalytic system 2) | | | | | Polyisoprene |
| E | Enriched C5 fraction | 9 | 350 | 20 | 46 | — |
| | | | | 40 | 73 | — |
| | | | | 60 | 84 | — |
| | | | | 120 | 100 | 4.55 |
| F | control | 9 | 320 | 20 | 59 | — |
| | | | | 40 | 86 | — |
| | | | | 60 | 99 | 4.25 |
| | | | | 120 | 100 | 4.21 |
| G | Enriched C5 fraction | 9 | 390 | 20 | 59 | — |
| | | | | 40 | 86 | — |
| | | | | 60 | 96 | 3.97 |
| | | | | 120 | 100 | 3.97 |
| H | control | 9 | 360 | 20 | 62 | — |
| | | | | 40 | 90 | — |
| | | | | 60 | 100 | 3.93 |
| | | | | 120 | 100 | 3.83 |

These results show that Catalytic system 2 of the present invention permitted the selective polymerization of isoprene from a steam-cracked C5 naphtha fraction enriched to only 56% isoprene, with a reaction rate analogous to that relating to the polymerization of practically pure isoprene ("control").

As mentioned in Example 1, the polyisoprenes which were prepared at a temperature of 50° C. from the C5 fraction enriched to 56% isoprene, just like the "control" polyisoprenes, all have the same 98.0% cis-1,4 linkage content, measured by the $^{13}$C-NMR technique and by the MIR technique, performed in detail in the "Measurements and Tests" below.

Moreover, the polyisoprenes obtained had particularly low polymolecularity indices, which varied from 2.1 to 2.3 as measured by SEC measurement method described in detail in "Measurements and Tests" below.

Example 3

Synthesis of Polyisoprenes from Third C5 Fractions Enriched with Isoprene

I. Obtaining Two Third C5 Fractions Enriched with Isoprene According to the Invention The initial C5 fraction was subjected to a series of stages of enrichment in isoprene, in order to obtain the two enriched C5 fractions in which the mass fraction of isoprene in each was 57%.

The procedure was performed as described in section (I). of Example 2, with the exception that the first stage of "extractive" distillation on the 50-plate column (implemented by means of a polar extraction solvent consisting of dimethyl formamide in a concentration of 3%) was followed by the following three stages:

two successive catalytic hydrogenation operations which were such that the mass fraction of the vinylacetylenes ("true" alkynes) was reduced to 10 ppm in each of the two fractions (the mass fraction of vinylacetylenes before these catalytic hydrogenation operations being 950 ppm, just as in Example 2 before the stage of distillation over DiBAH), then distillation was reduced to a value less than 5 ppm (distillation implemented in the same manner as in Examples 1 and 2), then passing the fraction thus obtained over alumina or over a molecular sieve of type "3A", such that practically all of the residue polar compounds were removed in order to obtain the two C5 fractions in accordance with this third example, respectively.

The two catalytic hydrogenation operations were carried out using the same Lindlar catalyst (comprising palladium in a mass fraction of 5%, on calcium carbonate "poisoned" with lead).

The operating conditions for these hydrogenation operations were as follows:

reactor: 250 ml "Steinie" bottle, with stirring in a water tank (tightness of the bottle being ensured by a "septum/open-top seal" assembly that permitted introduction of hydrogen by means of a needle);

treated volume: 100 ml, or 68 g;

Lindlar catalyst: 70 mg;

hydrogen pressure in the reactor: 3 bar for each hydrogenation operation;

reaction time: 6 hours for each hydrogenation operation;

reaction temperature: 60° C.

Each C5 fraction thus hydrogenated was then filtered, by means of a filter of "HPLC" quality.

Following these two hydrogenation operations, the mass fraction of vinylacetylenes (10 ppm) present in each C5 fraction was substantially the same as that obtained in Examples 1 and 2, after distillation over DiBAH.

Analysis by gas phase chromatography made it possible to determine the composition of each enriched C5 fraction in accordance with this third example of embodiment of the invention following the aforementioned four stages (expressed in mass fractions of constituents in each fraction):

| | |
|---|---|
| 1-pentene | 5% |
| 2-methyl-1-butene | 12% |
| pentane | 21% |
| isoprene | 57% |
| others | 2% |
| 2-pentene | 3%. |

It will be noted that the relative mass ratio of mono-olefins:isoprene was substantially equal to 35.1% in this third example of embodiment.

The relative mass ratios of α-olefins:isoprene and β-olefins:isoprene, were substantially equal to 29.8% and 5.3%, respectively.

II. Preparation of Catalytic System 3 According to the Third Example of Embodiment of the Invention for the Polymerization of Isoprene Catalytic system 3 comprised a phosphated neodymium salt as synthesized in Example 1, and differed from the catalytic system 1 of Example 1 by:

the relative molar ratios Nd salt:butadiene (Bd hereafter):DiBAH:DEAC, respectively 1:30:1,8:2,6, and the duration of the alkylation stage, which was 30 minutes.

III. Preparation of Polyisoprenes by Means of Catalytic System 3, from the Two Enriched C5 Fractions in Accordance with this Third Example of Embodiment As in Example 1, polymerization tests were carried out, using either the two enriched C5 fractions in accordance with this third example or 99.2% pure isoprene ("control" test).

The sole differences from the tests of Example 1 were as follows:

the mass fraction of isoprene in the polymerization medium was 10%, the tests were carried out with a mass ratio S:M (solvent:monomer) which was equal to 9;

the quantity of neodymium catalyst base used was 440 micromoles per 100 grams of monomer for each of the two tests in accordance with this third example according to the invention, and which was 400 micromoles per 100 grams of monomer for said "control" test (quantities expressed in μMcm).

The conditions of polymerization and recovery of the polyisoprenes were the same as those described in Example 1.

Table 4 below sets forth the results obtained.

TABLE 4

| | | Polymerization conditions (at 50° C. with the catalytic system 3) | | | | Polyisoprene |
|---|---|---|---|---|---|---|
| Test | Isoprene used | Ratio S:M | Quantity of Nd (μMcm) | Reaction time (min.) | Conversion rate (%) | Inherent viscosity (dl/g) |
| I | Enriched C5 fraction (passed over alumina) | 9 | 440 | 20 | 64 | — |
| | | | | 40 | 89 | — |
| | | | | 60 | 97 | 4.19 |

TABLE 4-continued

| | | Polymerization conditions (at 50° C. with the catalytic system 3) | | | | Polyisoprene |
|---|---|---|---|---|---|---|
| Test | Isoprene used | Ratio S:M | Quantity of Nd (μMcm) | Reaction time (min.) | Conversion rate (%) | Inherent viscosity (dl/g) |
| J | Enriched C5 fraction (passed over 3A sieve) | 9 | 440 | 20 40 60 | 62 90 98 | — — 3.94 |
| K | control | 9 | 400 | 20 40 60 | 71 95 100 | — — 4.23 |

These results show that the catalytic system 3 according to the invention permitted the selective polymerization of isoprene from steam-cracked C5 naphtha fractions which had each been enriched to 57% isoprene, by carrying out a catalytic hydrogenation reaction in order to reduce the amount of vinylacetylenes, with a reaction rate analogous to that relating to the polymerization of practically pure isoprene ("control").

As mentioned in Examples 1 and 2, the polyisoprenes which were prepared at a temperature of 50° C. from each enriched C5 fraction in accordance with this third example, just like the "control" polyisoprene, all have the same 98.0% cis-1,4 linkage content measured by the $^{13}$C-NMR technique and by the MIR technique.

It will be noted that the polyisoprenes obtained had particularly low polymolecularity indices, which vary from 2.1 to 2.3 as measured by SEC measurement.

MEASUREMENTS AND TESTS

Determination of the Microstructure of the Polyisoprenes

1) By carbon-13 nuclear magnetic resonance analysis ($^{13}$C-NMR analysis):

a) Preparation of the samples:

2 g of polyisoprene were extracted in refluxing acetone for 8 hours. The extracted polyisoprene was then dried at ambient temperature under a vacuum for 24 hours. This dried polyisoprene was then redissolved in chloroform. The polyisoprene solution was filtered and the solvent removed in a rotary evaporator for 4 hours (bath temperature is 40° C.).

For the purposes of the analysis, approximately 600 mg the of polyisoprene prepared in this manner were solubilized in CDCl$_3$ (2 ml) directly in a $^{13}$C NMR tube.

a) Characteristics of the apparatus:
  Spectrophotometer sold under the name "BRUKER AM250".
  Resonance frequency (SFO)=62.9 MHz.
  Pulse program: INVGATE.AU (suppression of "NOE" effect for quantitative analysis of $^{13}$C by NMR).
  Pulse duration: 9 μs (90°).
  Relaxation time: 10 s.
  Cumulative number of scans (NS)=8192.

c) Assignment of spectrum peaks:
Peaks were identified following:
Quang Tho Pham, R. Petiaud, H. Waton, M. F. Llauro Darricades, "*Proton and NMR Spectra of Polymers*", 1991, Penton Press.

d) Integration method:
  No 1,2-structural units detected.
  The ratio between 3,4- and 1,4-contents was determined by means of the ethylenic carbons. The content of trans-1,4 and cis-1,4 linkages in the polyisoprene was calculated from the aliphatic carbons.

2) By mid-infrared (MIR) analysis:

a) Sample preparation:

The polyisoprene as prepared in paragraph 1) above was used for this infrared analysis, while for NMR the sample was extracted with acetone and then dried in an oven.

A polyisoprene solution of exactly 10 g/l in CCl$_4$ was analyzed using a KBr cell with a pathlength of 0.2 mm.

b) Apparatus:

Spectrophotometer sold under the name "BRUKER IFS88".
  Recording conditions:
    beam opening: maximum;
    resolution: 2 cm$^{-1}$;
    moving mirror speed: 0.639 cm.s$^{-1}$;
    detector: DTGS;
    accumulations: 64 scans;
    purge time: 3 min;
    spectral window: 4000 to 400 cm$^{-1}$;
    transmission spectra recorded;
    reference: CCl$_4$ solvent.
  Spectrum processing:
    transfer to microcomputer;
    processing with "OPUS" software from "BRUKER".

c) Assignment of spectrum peaks:

Spectral studies and the contents of the following documents made it possible to determine the characteristic bands of the various linkage modes:

Y. Tanaka, Y. Takeuchi, M. Kobayashi, H. Tadokoro, *Journal of Polymer Science*, Part A-2, 1971, 9(1), 43–57.

J. P. Kistel, G. Friedman, B. Kaempf, *Bulletin de la Société Chimique de France*, 1967, no. 12.

F. Asssioma, J. Marchal, *C. R. Acad. Sc. Paris*, Ser C, 1968, 266(22), 1563–6 and Ser D, 1968, 266(6), 369–72.

T. F. Banigan, A. J. Verbiscar, T. A. Oda, *Rubber Chemistry and Technology*, 1982, 55(2), 407–15.

The 3–4 conformation exhibited two characteristic bands:
  a high intensity band at 880 cm$^{-1}$ corresponding to the out-of-plane deformation vibrations (δ C—H) of the terminal hydrogens of the vinyl group (=CH$_2$) and
  a band at 3070 cm$^{-1}$ corresponding to the ν C—H stretching of this same group (=CH$_2$).

The cis-+b 1,4 conformation had a characteristic band around 3030 cm$^{-1}$. This band corresponds to the ν C—H stretching vibrations of the =CH group.

The band corresponding to the symmetrical deformation vibrations of the methyl groups (δ CH$_3$) was a complex band incorporating all three conformations. Absorption corresponding to the δ CH$_3$ of the trans-+b 1,4 conformation was at its maximum around 1385 cm$^{-1}$; this was a shoulder of the band.

d) Integration method:

The cis-3,4 and 1,4 bands were integrated by the tangential area method.

The 1,4-trans absorption maximum was located on the shoulder of the intense δ CH$_3$ band. The most suitable method in this case was to measure the height of the band using the tangent of the δ CH$_3$ band as the baseline.

e) Calibration curves:

Statement of Beer-Lambert law:

$$Do(\nu \text{ or } \delta) = \epsilon(\nu \text{ or } \delta)ec$$

where:

Do(ν or δ)=optical density of the band ν or δ;

ε(ν or δ)=molar extinction coefficient of the analyte responsible for the band ν or δ;

c=molar concentration of the analyte; and e=sample thickness.

Commercial polyisoprenes (sold as "IR305", "NATSYN 2200" and "SKI-3S"), a polyisoprene synthesized in the laboratory (MC78) and natural rubber (NR) were used as standards. Compared at isoconcentration (solutions), the law may thus be written:

$$Dx=KX$$

where:

Dx=integration value of the band corresponding to structural unit X,

X=content of structural unit X in the rubber (determined by $^{13}C$ NMR), and

K=calibration constant.

The calibration curves Dx=f(X) were plotted for each of the structural units.

Determination of the Distribution of the Molecular Weights of the Elastomers Obtained by Size Exclusion Chromatography (SEC)

a) Principle of the measurement:

SEC (size exclusion chromatography) makes it possible physically to separate macromolecules by their size in the swollen state in columns filled with a porous stationary phase. The macromolecules are separated by their hydrodynamic volume, the bulkiest being eluted first.

Although not an absolute method, SEC does enable an assessment to be made of the molecular weight distribution of a polymer. On the basis of commercially available standards, the various number-average (Mn) and weight-average (Mw) molecular weights may be determined and the polydispersity index calculated (IP=Mw/Mn).

b) Preparation of the polymer:

The polymer sample was not subjected to any particular treatment prior to analysis, but is simply solubilized in tetrahydrofuran at a concentration of approximately 1 g/l.

c) SEC analysis:

The apparatus used was a "WATERS model 150C" chromatograph. The elution solvent is tetrahydrofuran, the flow rate 0.7 ml/min, the temperature of the system 35° C. and the duration of analysis 90 min. A set of four columns was used in series, the columns having the commercial names "SHODEX KS807", "WATERS type STYRAGEL HMW7" and two "WATERS STYRAGEL MHW6E".

The volume of polymer sample solution injected was 100 μl. The detector is a "WATERS model RI32X" differential refractometer and the chromatographic data processing software was "WATERS MILLENNIUM" (version 3.00).

Determination of the Composition of the "Control" Steam-cracked C5 Naphtha Fraction and the Fraction Enriched According to the Invention, by Gas Phase Chromatography (GPC)

a) GPC/FID analysis:

Analysis of each enriched C5 fraction according to the invention and of the "control" C5 fraction (with a mass fraction of isoprene close to 100%) was carried out from traces injected without prior dilution, in order not to saturate the response of the flame ionization detector (FID) used.

b) Chromatographic conditions used:
Chromatograph HP6890
Carrier gas: nitrogen
Pressure at the head of the column: 6.6 psi
Constant flow rate: 0.8 ml/min.
Method of injection: "split"
Ratio of "split": 50/1
Temperature of the injector: 250° C.
Injected volume: traces

| Column HP1: | methyl silicone phase |
|---|---|
| | length: 60 m |
| | internal diameter: 0.32 mm |
| | thickness of the film: 1.0 μm |
| Temperature program: | T1 = 30° C. |
| | D1 = 17 min. |
| | P1 = 20° C./min. |
| | T2 = 280° C. |
| | D2 = 20 min. |
| | FID temperature: 300° C. | c) Results:

Semi-quantitative analysis was performed by calculating the relative proportion of the areas of the peaks of each chromatogram, in order to obtain a distribution. The differences in responses of the eluted compounds were not taken into consideration, as the FID did not detect signals due to the presence of non-eluted and eluted compounds.

The proportion in % of a compound i is given by the following expression:

$$\%i = A_i / \Sigma A_i \times 100$$

where $A_i$=area relative to the compound i, and $\Sigma A_i$=total of all the eluted compounds i (identified and non-identified).

I claim:

1. A process for obtaining a polyisoprene from a steam-cracked C5 naphtha fraction enriched with isoprene comprising:

reacting the steam-cracked C5 naphtha fraction enriched with isoprene in the presence of a catalytic system, wherein said C5 fraction has a mass fraction of isoprene in a range of from 30% to 95%, and wherein said catalytic system is based on at least:
(a) a conjugated diene monomer,
(b) an organic phosphoric acid salt of a rare earth metal,
(c) an alkylating agent consisting of a trialkylaluminum compound or a dialkylaluminum hydride, and
(d) a halogen donor consisting of an alkylaluminum halide, wherein said rare earth salt is suspended in at least one inert saturated aliphatic or alicyclic hydrocarbon solvent which is included in said catalytic system, and the molar ratio of alkylating agent:rare earth salt is in a range of from 1 to 5.

2. The process of claim 1, wherein said catalytic system has a molar ratio of alkylating agent:rare earth salt that ranges from 1 to 2.

3. The process of claim 1, wherein the rare earth salt is a rare earth metal of tris[bis(2-ethylhexyl)phosphate].

4. The process of claim 3, wherein the rare earth salt is neodymium tris[bis(2-ethylhexyl)phosphate].

5. The process of claim 1, wherein said rare earth metal is present in a concentration of about 0.02 mol/l.

6. The process of claim 1, wherein said catalytic system has a molar ratio of halogen donor:rare earth salt in a range of from 2.6 to 3.

7. The process of claim 1, wherein said catalytic system has a molar ratio of conjugated diene monomer:rare earth salt in a range of from 25 to 50.

8. The process of claim 1, wherein said conjugated diene monomer is butadiene.

9. The process of claim 1, wherein said alkylating agent is diisobutylaluminum hydride.

10. The process of claim 1, wherein said halogen donor is diethylaluminum chloride.

11. The process of claim 1, wherein said mass fraction of isoprene is in a range of from 30% to 70%.

12. The process of claim 1, wherein said C5 fraction further comprises aliphatic and alicyclic mono-olefins, and wherein said C5 fraction has a mass ratio of aliphatic and alicyclic mono-olefins:isoprene of less than or equal to 50%.

13. The process of claim 12, wherein the mass ratio of aliphatic and alicyclic mono-olefins:isoprene is between 20% and 50%.

14. The process of claim 12, wherein said mono-olefins are selected from the group consisting of α-olefins and β-olefins, and wherein the mass ratio of α-olefins:isoprene is less than or equal to 30%, and the mass ratio of β-olefins:isoprene is less than or equal to 20%.

15. The process of claim 1, wherein said C5 fraction further comprises 1,3-pentadiene, and has a mass ratio of 1,3-pentadiene:isoprene of less than or equal to 0.5%.

16. The process of claim 1, wherein said C5 fraction further comprises disubstituted alkynes, and has a mass ratio of disubstituted alkynes:isoprene of less than or equal to 0.7%.

17. The process of claim 1, wherein said C5 fraction further comprises vinylacetylene compounds and has a mass ratio of vinylacetylene compounds:isoprene of less than or equal to 15 ppm (parts per million).

18. The process of claim 1, wherein said C5 fraction enriched with isoprene further comprises 1,4-pentadiene, and has a mass ratio of 1,4-pentadiene:isoprene that is less than or equal to 0.2%.

19. The process of claim 1, wherein said C5 fraction further comprises cyclopentadiene and having a mass ratio of cyclopentadiene:isoprene of less than or equal to 5 ppm.

20. The process of claim 1, wherein said C5 fraction further comprises limonene and having a mass ratio of limonene:isoprene less than or equal to 2%.

21. The process of claim 1, wherein said polyisoprene has a cis-1,4 linkage content in a range of from 98.0% to 99.6% as measured using carbon-13 nuclear magnetic resonance and/or mid-infrared analysis.

* * * * *